United States Patent
Chang et al.

(10) Patent No.: US 9,019,242 B2
(45) Date of Patent: Apr. 28, 2015

(54) TOUCH DISPLAY DEVICE WITH DUAL-SIDED DISPLAY AND DUAL-SIDED TOUCH INPUT FUNCTIONS

(75) Inventors: Tien-Hao Chang, Hsin-Chu (TW);
Jiun-Jye Chang, Hsin-Chu (TW);
An-Thung Cho, Hsin-Chu (TW);
Chi-Wen Fan, Hsin-Chu (TW);
Wei-Peng Weng, Hsin-Chu (TW);
Yu-Min Lee, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 382 days.

(21) Appl. No.: 13/476,009

(22) Filed: May 20, 2012

(65) Prior Publication Data
US 2013/0100079 A1   Apr. 25, 2013

(30) Foreign Application Priority Data
Oct. 24, 2011   (TW) .............................. 100138529 A

(51) Int. Cl.
*G06F 3/042*   (2006.01)
*G06F 3/041*   (2006.01)
*G06F 3/0354*  (2013.01)

(52) U.S. Cl.
CPC .............. *G06F 3/0412* (2013.01); *G06F 3/042* (2013.01); *G06F 3/03545* (2013.01)

(58) Field of Classification Search
CPC .... G06F 3/0412; G06F 3/042; G06F 3/03545
USPC ............. 345/173, 175, 176; 178/18.01–18.06
See application file for complete search history.

(56) References Cited

U.S. PATENT DOCUMENTS

| | | | |
|---|---|---|---|
| 8,810,524 B1* | 8/2014 | Rosenberg et al. | 345/173 |
| 2006/0092355 A1* | 5/2006 | Yang et al. | 349/114 |
| 2006/0209045 A1* | 9/2006 | Su et al. | 345/173 |
| 2007/0108454 A1* | 5/2007 | Yamazaki et al. | 257/88 |
| 2008/0303982 A1* | 12/2008 | Jin et al. | 349/69 |
| 2009/0167728 A1* | 7/2009 | Geaghan et al. | 345/179 |
| 2009/0283772 A1 | 11/2009 | Cho | |
| 2010/0156847 A1 | 6/2010 | No | |
| 2010/0164904 A1 | 7/2010 | Kim | |
| 2010/0194705 A1 | 8/2010 | Kim | |
| 2010/0277439 A1* | 11/2010 | Charlier et al. | 345/176 |

(Continued)

FOREIGN PATENT DOCUMENTS

CN   101285975 A   10/2008
CN   101825797 A   9/2010

(Continued)

*Primary Examiner* — Pegeman Karimi
(74) *Attorney, Agent, or Firm* — Winston Hsu; Scott Margo

(57) ABSTRACT

A touch display device includes a first substrate, a second substrate, a plurality of sub-pixel regions, a plurality of display devices, a plurality of first optical touch sensor device and second optical touch sensor devices. The first substrate and the second substrate are disposed oppositely. The display devices are disposed in the sub-pixel regions, respectively, to provide images for a first display surface and a second display surface. The first optical touch sensor devices are disposed on the first substrate and at least corresponding to part of the sub-pixel regions for implementing touch input function on the first display surface. The second optical touch sensor devices are disposed on the first substrate and at least corresponding to part of the sub-pixel regions for implementing touch input function on the second display surface.

26 Claims, 10 Drawing Sheets

(56) References Cited

U.S. PATENT DOCUMENTS

2011/0134084 A1    6/2011  Ho
2012/0062469 A1*   3/2012  Guard ........................... 345/173

FOREIGN PATENT DOCUMENTS

| CN | 101957695 A | 1/2011 |
| CN | 102087553 A | 6/2011 |

* cited by examiner

TOUCH DISPLAY DEVICE WITH DUAL-SIDED DISPLAY AND DUAL-SIDED TOUCH INPUT FUNCTIONS

BACKGROUND OF THE DISCLOSURE

1. Field

The disclosure relates to a touch display device, and more particularly, to a touch display device with dual-sided display and dual-sided touch input functions.

2. Description of the Prior Art

Due to its human machine interactive characteristic, touch panel has gradually replaced traditional keypad or keyboard as an input interface in various kinds of electronic products such as Smartphone, tablet PC, digital camera and laptop PC. Recently, an in-cell touch display panel that integrates a touch panel into a display panel has been proposed to fulfill a touch display panel with reduced size and thickness. However, the conventional touch display panel can only provide single side input function, which limits applications of touch display panel.

SUMMARY

It is one of the objectives of the disclosure to provide a touch display device with dual-sided display and dual-sided touch input functions.

According to an embodiment of the disclosure, a touch display panel is provided. The touch display device includes a first substrate, a second substrate, a plurality of sub-pixel regions, a plurality of display devices, a plurality of first optical touch sensor devices, and a plurality of second optical touch sensor devices. The second substrate is disposed opposite to the first substrate. The display devices are disposed in the sub-pixel regions, respectively, to provide images for a first display surface and a second display surface. The first optical touch sensor devices are disposed on the first substrate and corresponding to at least a portion of the sub-pixel regions for implementing touch input function on the first display surface. The second optical touch sensor devices are disposed on the first substrate and corresponding to at least a portion of the sub-pixel regions for implementing touch input function on the second display surface.

These and other objectives of the present disclosure will no doubt become obvious to those of ordinary skill in the art after reading the following detailed description of the embodiment that is illustrated in the various figures and drawings.

DETAILED DESCRIPTION

To provide a better understanding of the present disclosure to the skilled users in the technology of the present disclosure, embodiments will be detailed as follows. The embodiments of the present disclosure are illustrated in the accompanying drawings with numbered elements to elaborate the contents and effects to be achieved.

Figure 1:
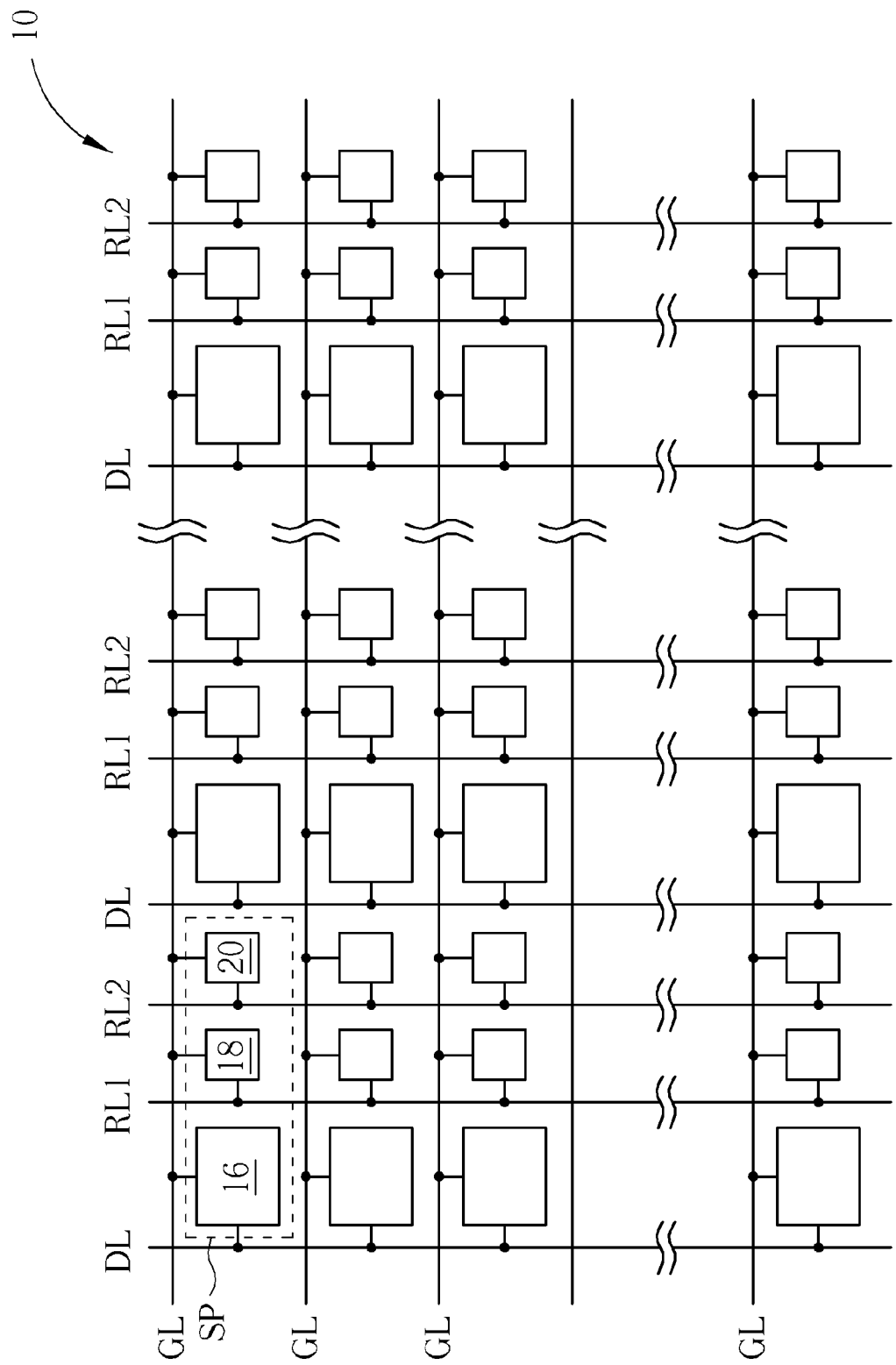
FIG. 1 and FIG. 2 are schematic diagrams illustrating a touch display device according to a first embodiment of the disclosure.
Figure 2:
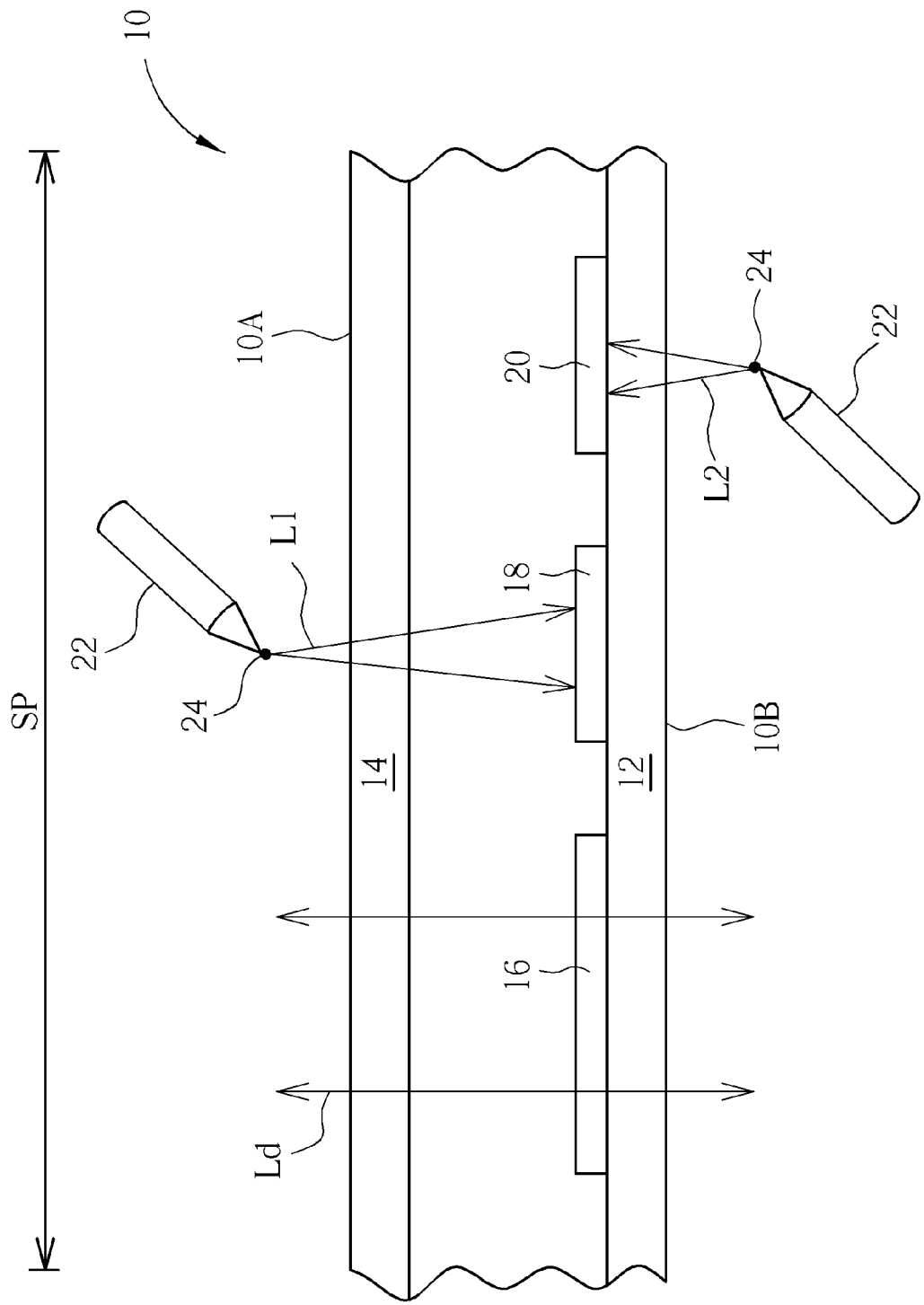

Please refer to FIG. 1 and FIG. 2. FIG. 1 and FIG. 2 are schematic diagrams illustrating a touch display device according to a first embodiment of the disclosure, where FIG. 1 is a framework diagram of a touch display device, and FIG. 2 is a cross-sectional view of a touch display device. As shown in FIG. 1 and FIG. 2, the touch display device 10 of this embodiment includes a first substrate 12, a second substrate 14, a plurality of gate lines GL, a plurality of data lines DL, a plurality of display devices 16, a plurality of first optical touch sensor devices 18, and a plurality of second optical touch sensor devices 20. The first substrate 12 and the second substrate 14 are disposed oppositely, and the first substrate 12 and the second substrate 14 are transparent substrates e.g. glass substrates, but not limited thereto. In this embodiment, the touch display device 10 has dual-sided display function, where the surface of the second substrate 14 is defined as a first display surface 10A and the surface of the first substrate 12 is defined as a second display surface 10B. Namely, the second display surface 10B is disposed opposite to the first display surface 10A, and the first display surface 10A and the second display surface 10B are two surfaces of the touch display device 10 disposed oppositely and in parallel. The gate lines GL and the data lines DL are disposed on the first substrate 12, and intersected with each other to define a plurality of sub-pixel regions SP. The display devices 16 are disposed in the corresponding sub-pixel regions SP, respectively, to provide display images Ld for the first display surface 10A and the second display surface 10B of the touch display device 10. Each of the display devices 16 is electrically connected to the corresponding gate line GL and the corresponding data line DL. In this embodiment, the touch display device 10 may be various types of touch display device. For example, the touch display device 10 may be a touch liquid crystal display (LCD) device. In such a case, the display devices 16 may include all the display devices required for an LCD device such as active devices (e.g. thin film transistor (TFT) devices), pixel electrodes, common electrode, liquid crystal layer, color filters, polarizers, etc. The touch display device 10 may also be, for instance, a touch electroluminescent device. In such a case, the display devices 16 may include all the display devices required for an electroluminescent device such as active devices (e.g. thin film transistor devices), anodes, cathodes, organic light-emitting layer, etc.

The first optical touch sensor devices 18 are disposed on the first substrate 12 and corresponding to at least a portion of the sub-pixel regions SP to provide touch input function on the first display surface 10A of the touch display device 10. The second optical touch sensor devices 20 are disposed on the first substrate 12 and corresponding to at least a portion of the sub-pixel regions SP to provide touch input function on the second display surface 10B of the touch display device 10. In this embodiment, the touch display device 10 may further include at least one first readout line RL1 and at least one second readout line RL2 disposed on the first substrate 12. The first readout line RL1 is electrically connected to the first optical touch sensor devices 18 for reading the touch input signals detected by the first optical touch sensor devices 18, and the second readout line RL2 is electrically connected to the second optical touch sensor devices 20 for reading the touch input signals detected by the second optical touch sensor devices 20. The first optical touch sensor devices 18 and the second optical touch sensor devices 20 may be various types of optical sensor devices, and operated in a passive sensing manner or an active sensing manner. If a passive sensing framework is used, the first optical touch sensor devices 18 and the second optical touch sensor devices 20 are electrically connected to the corresponding active devices (e.g. TFT devices), and electrically connected to the first readout line RL1 and the second readout line RL2 through the active devices. If an active sensing framework is used, the first optical touch sensor devices 18 and the second optical touch sensor devices 20 are electrically connected to amplifier device (the amplifier device may be implemented by a plurality of TFT devices, but not limited thereto), electrically connected to the active devices (e.g. TFT devices), and electrically connected to the first readout line RL1 and the second readout line RL2 through the active devices. The advantages of the passive sensing framework is its high fill factor (FF) and high aperture ratio, and the advantages of the active sensing framework is its high sensibility and high signal-to-noise ratio (SNR). It is the discretion of the designer to select a proper sensing framework based on different requirements or specifications. The processing unit (not shown) of the touch display device 10 can determine whether the touch input signal is detected on the first display surface 10A or on the second display surface 10B. As shown in FIG. 2, the touch display device 10 of this embodiment may further include a stylus 22. The stylus 22 includes a light-emitting device 24 for emitting a light L1 on the first optical touch sensor device 18 to implement touch input on the first display surface 10A, or for emitting a light L2 on the second optical touch sensor device 20 for implementing touch input on the second display surface 10B.

In this embodiment, the first optical touch sensor devices 18 and the second optical touch sensor devices 20 are disposed in all of the sub-pixel regions SP, but not limited thereto. For example, based on different touch resolution requirement, the first optical touch sensor devices 18 and the second optical touch sensor devices 20 may be disposed in a portion of the sub-pixel regions SP.

The touch display device is not limited by the aforementioned embodiment, and may have other different embodiments. To simplify the description, the identical components in each of the following embodiments are marked with identical symbols. For making it easier to compare the difference between the embodiments, the following description will detail the dissimilarities among different embodiments and the identical features will not be redundantly described.

Figure 3:
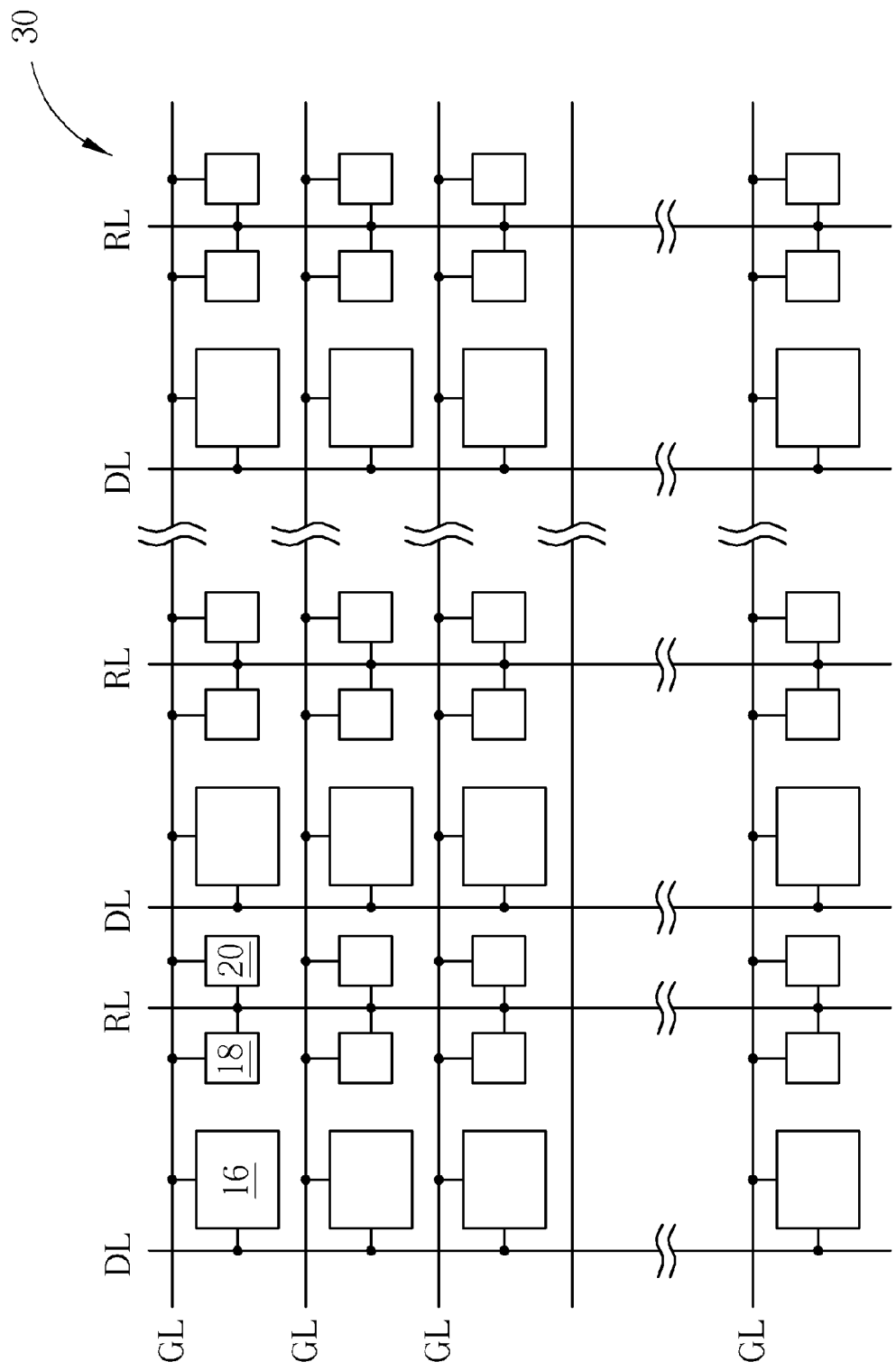
FIG. 3 is a framework diagram illustrating a touch display device according to a second embodiment of the disclosure.

Please refer to FIG. 3. FIG. 3 is a framework diagram illustrating a touch display device according to a second embodiment of the disclosure. As shown in FIG. 3, different from the first embodiment, the touch display device 30 of this embodiment includes at least one readout line RL, disposed on the first substrate 12 and electrically connected to the first optical touch sensor devices 18 and the second optical touch sensor devices 20 for reading the touch input signals detected by the first optical touch sensor devices 18 and the second optical touch sensor devices 20. In other words, at least a portion of the first optical touch sensor devices 18 and at least a portion of the second optical touch sensor devices 20 share the same readout line RL. In this embodiment, the first optical touch sensor devices 18 and the second optical touch sensor devices 20 preferably have different sensing characteristics, so that the touch input signal detected by the first optical touch sensor devices 18 and the touch input signal detected by the second optical touch sensor devices 20 are distinguishable. In such a case, the processing unit (not shown) of the touch display device 30 can determine whether the touch input is implemented on the first display surface 10A or on the second display surface 10B. For example, the first optical touch sensor devices 18 and the second optical touch sensor devices 20 may be different types of sensor devices, or have different optical sensing materials, or have different optical sensing areas.

Figure 4:
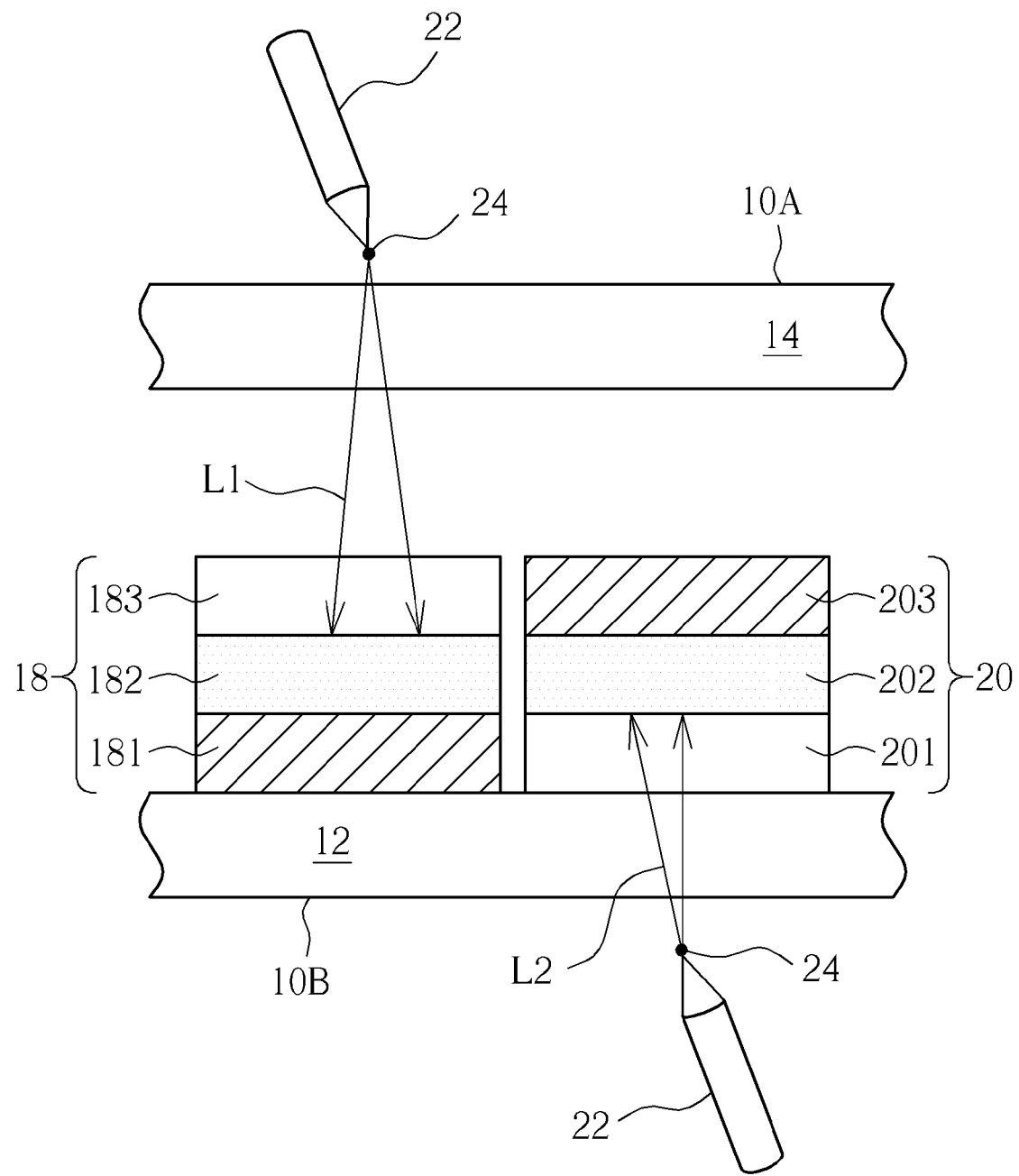
FIG. 4 is a schematic diagram illustrating a first optical touch sensor device and a second optical touch sensor device according to a first embodiment of the disclosure.

Please refer to FIG. 4. FIG. 4 is a schematic diagram illustrating a first optical touch sensor device and a second optical touch sensor device according to a first embodiment of the disclosure. As shown in FIG. 4, the first optical touch sensor device 18 includes a first electrode 181 disposed on the first substrate 12, a first optical sensor layer 182 disposed on the first electrode 181, and a second electrode 183 disposed on the first optical sensor layer 182. The second optical touch sensor device 20 includes a third electrode 201 disposed on the first substrate 12, a second optical sensor layer 202 disposed on the third electrode 201, and a fourth electrode 203 disposed on the second optical sensor layer 202. The first optical sensor layer 181 and the second optical sensor layer 202 may be various types of optical sensor layers, e.g. amorphous silicon layer or silicon-rich dielectric layer (such as silicon-rich silicon oxide layer, silicon-rich silicon nitride layer or silicon-rich silicon oxynitride layer), but not limited thereto. In this embodiment, the first electrode 181 includes an opaque (not-transparent) electrode e.g. a metal electrode, and the second electrode 183 includes a transparent electrode e.g. an ITO electrode. Accordingly, when the touch input is carried out on the first display surface 10A, the light L1 emitted by the light-emitting device 24 of the stylus 22 can pass through the second electrode 183 and reach the first optical sensor layer 182, thereby generating touch input signal. Since the first electrode 181 is an opaque electrode, the light L1 does not pass through the second display surface 10B, and thus images display on the second display surface 10B is not affected. The light L1 may be reflected by the first electrode 181 to enhance the touch input signal, and thus touch sensibility can be enhanced. On the other hand, the third electrode 201 includes a transparent electrode e.g. an ITO electrode, and the fourth electrode 203 includes an opaque electrode e.g. a metal electrode. Accordingly, when the touch input is carried out on the second display surface 10B, the light L2 emitted by the light-emitting device 24 of the stylus 22 can pass through the third electrode 201 and reach the second optical sensor layer 202, thereby generating touch input signal. Since the fourth electrode 203 is an opaque electrode, the light L2 does not pass through the first display surface 10A, and thus images display on the first display surface 10A is not affected. The light L2 may be reflected by the fourth electrode 203 to enhance the touch input signal, and thus touch sensibility can be enhanced.

Figure 5:
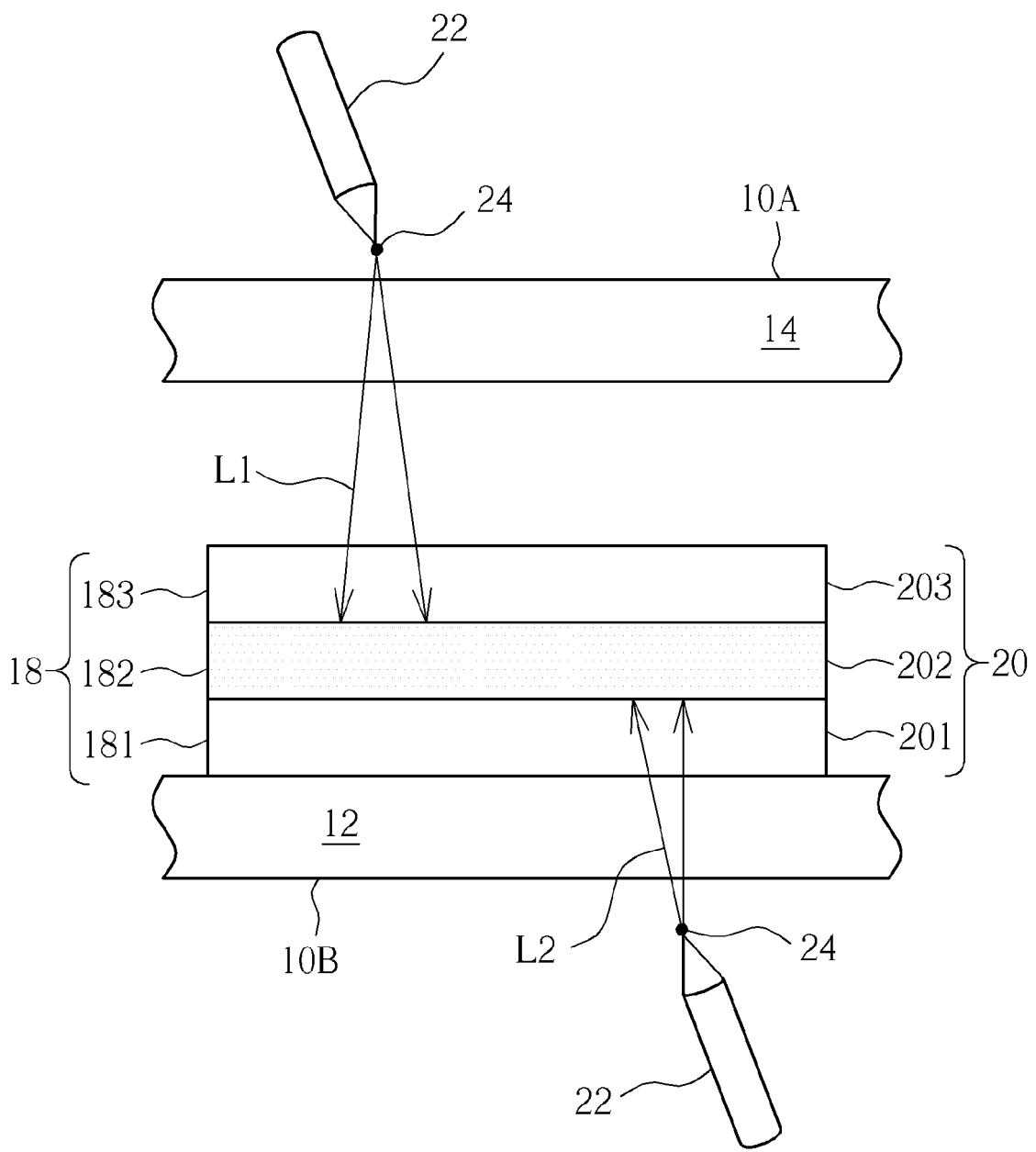
FIG. 5 is a schematic diagram illustrating a first optical touch sensor device and a second optical touch sensor device according to a second embodiment of the disclosure.

Please refer to FIG. 5. FIG. 5 is a schematic diagram illustrating a first optical touch sensor device and a second optical touch sensor device according to a second embodiment of the disclosure. As shown in FIG. 5, the first electrode 181 of the first optical touch sensor device 18 and the third electrode 201 of the second optical touch sensor device 20 are electrically connected to each other, the first optical sensor layer 182 and the second optical sensor layer 202 are electrically connected to each other, and the second electrode 183 and the fourth electrode 203 are electrically connected to each other. In addition, each of the first electrode 181, the second electrode 183, the third electrode 201 and the fourth electrode 203 includes a transparent electrode. The first electrode 181 and the third electrode 201 are preferably made of the same transparent conductive pattern, and the second electrode 183 and the fourth electrode 203 are preferably made of the same transparent conductive pattern, but not limited thereto.

Figure 6:
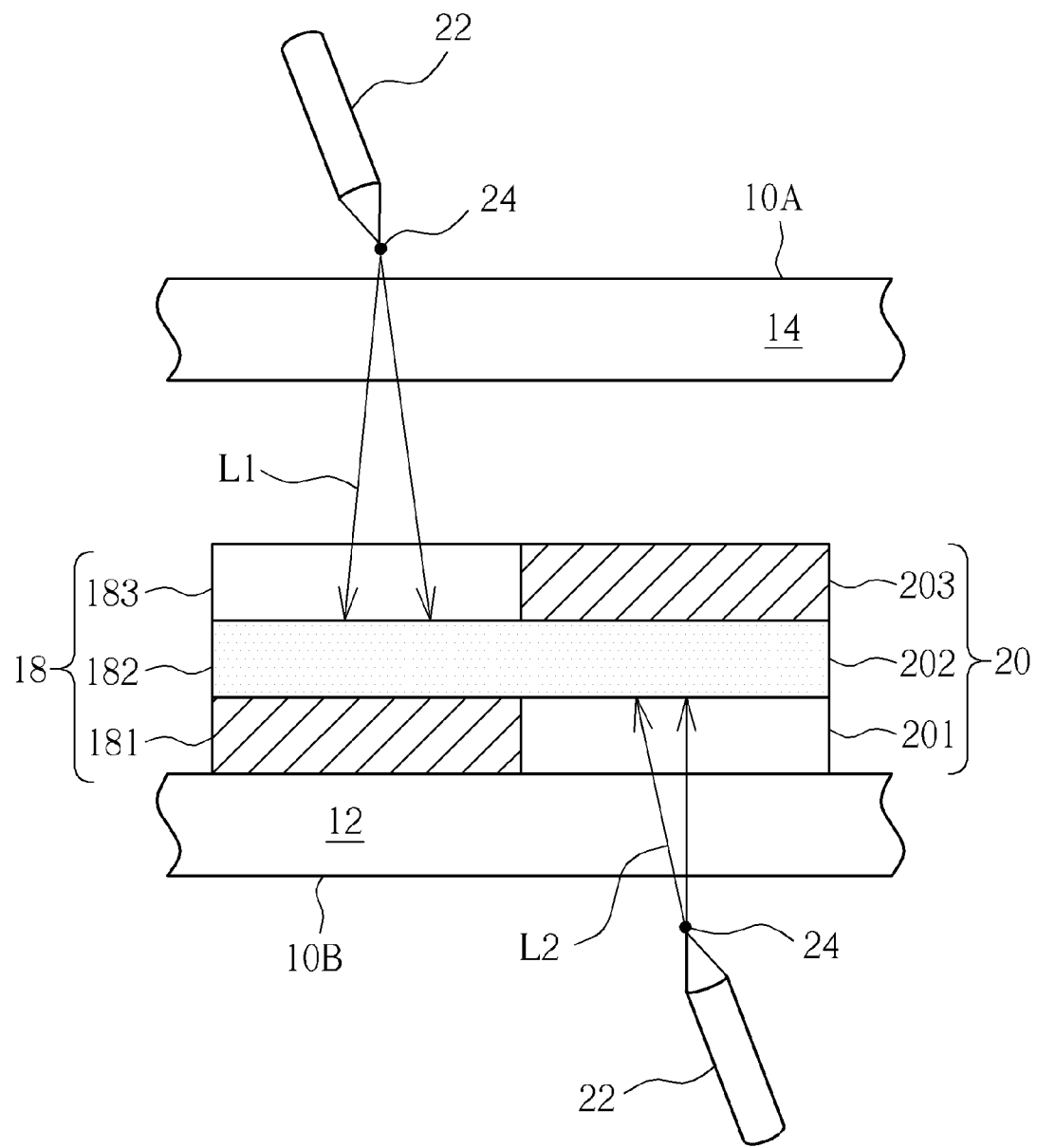
FIG. 6 is a schematic diagram illustrating a first optical touch sensor device and a second optical touch sensor device according to a third embodiment of the disclosure.

Please refer to FIG. 6 which is a schematic diagram illustrating a first optical touch sensor device and a second optical touch sensor device according to a third embodiment of the disclosure. As shown in FIG. 6, the first electrode 181 of the first optical touch sensor device 18 and the third electrode 201 of the second optical touch sensor device 20 are electrically connected to each other, the first optical sensor layer 182 and the second optical sensor layer 202 are electrically connected to each other, and the second electrode 183 and the fourth electrode 203 are electrically connected to each other. In addition, the first electrode 181 and the fourth electrode 203 include opaque electrodes, and the second electrode 183 and the third electrode 201 include transparent electrodes.

Figure 7:
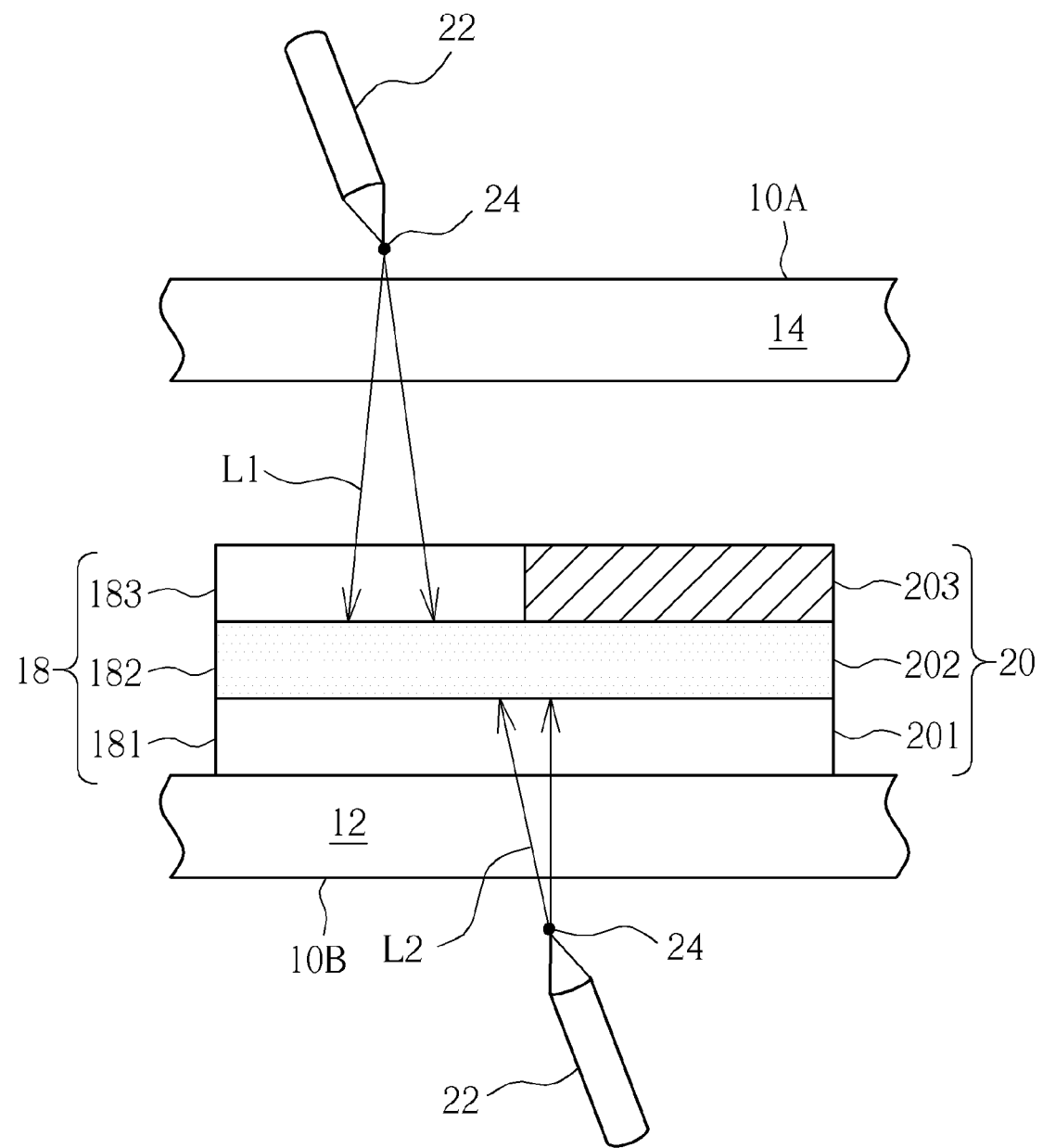
FIG. 7 is a schematic diagram illustrating a first optical touch sensor device and a second optical touch sensor device according to a fourth embodiment of the disclosure.

Please refer to FIG. 7. FIG. 7 is a schematic diagram illustrating a first optical touch sensor device and a second optical touch sensor device according to a fourth embodiment of the disclosure. As shown in FIG. 7, the first electrode 181 of the first optical touch sensor device 18 and the third electrode 201 of the second optical touch sensor device 20 are electrically connected to each other, the first optical sensor layer 182 and the second optical sensor layer 202 are electrically connected to each other, and the second electrode 183 and the fourth electrode 203 are electrically connected to each other. In addition, the first electrode 181, the second electrode 183 and the third electrode 201 include transparent electrodes, and the fourth electrode 203 includes an opaque electrode. The first electrode 181 and the third electrode 201 are preferably made of the same transparent conductive pattern, but not limited thereto.

Figure 8:
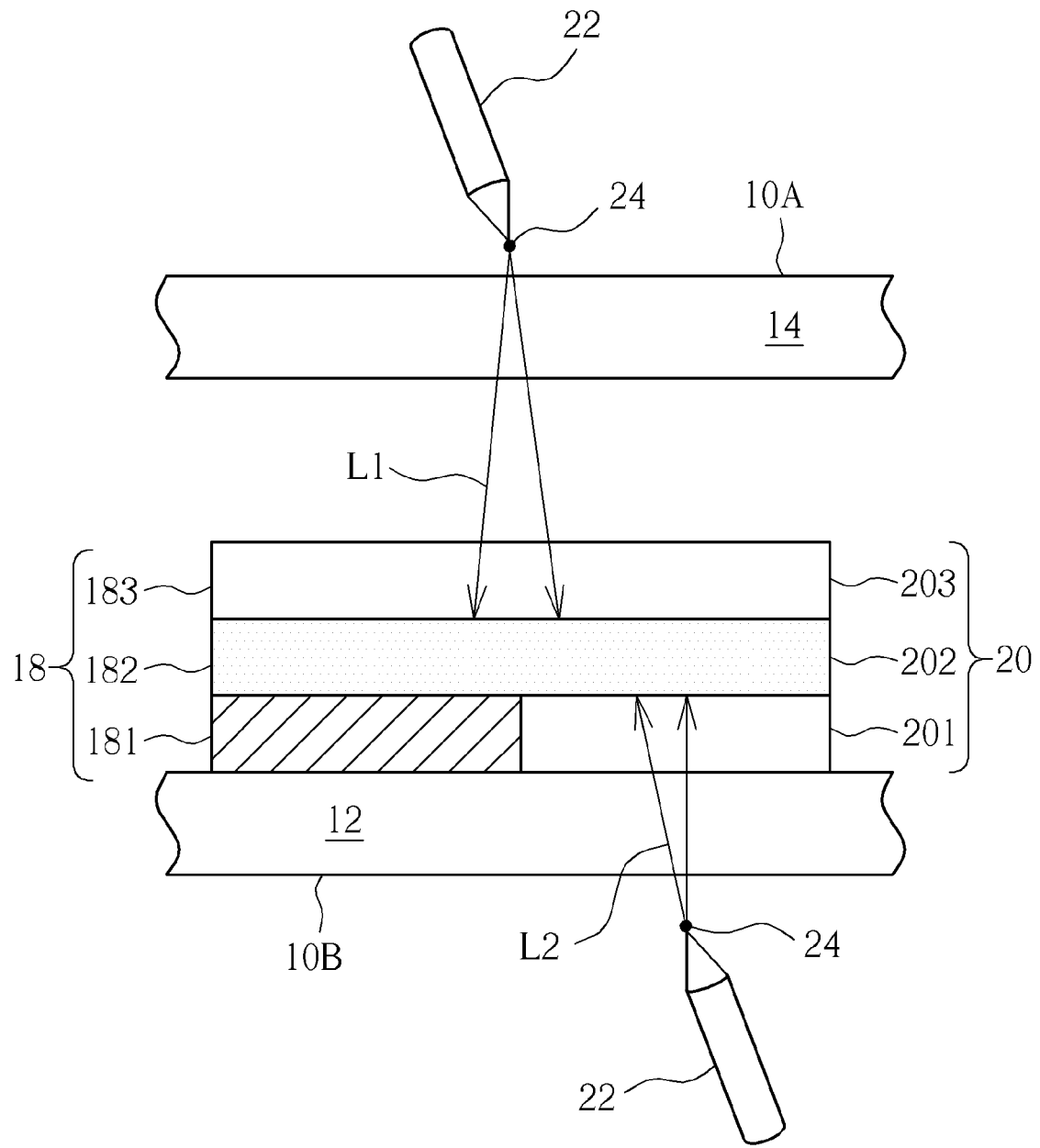
FIG. 8 is a schematic diagram illustrating a first optical touch sensor device and a second optical touch sensor device according to a fifth embodiment of the disclosure.

Please refer to FIG. 8. FIG. 8 is a schematic diagram illustrating a first optical touch sensor device and a second optical touch sensor device according to a fifth embodiment of the disclosure. As shown in FIG. 8, the first electrode 181 of the first optical touch sensor device 18 and the third electrode 201 of the second optical touch sensor device 20 are electrically connected to each other, the first optical sensor layer 182 and the second optical sensor layer 202 are electrically connected to each other, and the second electrode 183 and the fourth electrode 203 are electrically connected to each other. In addition, the first electrode 181 includes an opaque electrode, and the second electrode 183, the third electrode 201 and the fourth electrode 203 include transparent electrodes. The second electrode 183 and the fourth electrode 203 are preferably made of the same transparent conductive pattern, but not limited thereto.

In the disclosure, the second electrode 183 of the first optical touch sensor device 18 and the third electrode 201 of the second optical touch sensor device 20 are transparent. Consequently, when the touch input is carried out on the first display surface 10A, the light L1 emitted by the light-emitting device 24 of the stylus 22 can pass through the second electrode 183 and reach the first optical sensor layer 182, thereby generating touch input signal. When the touch input is carried out on the second display surface 10B, the light L2 emitted by the light-emitting device 24 of the stylus 22 can pass through the third electrode 201 and reach the second optical sensor layer 202, thereby generating touch input signal. The first electrode 181 of the first optical touch sensor device 18 and the fourth electrode 203 of the second optical touch sensor device 20 may be transparent or non-transparent based on different considerations.

Figure 9:
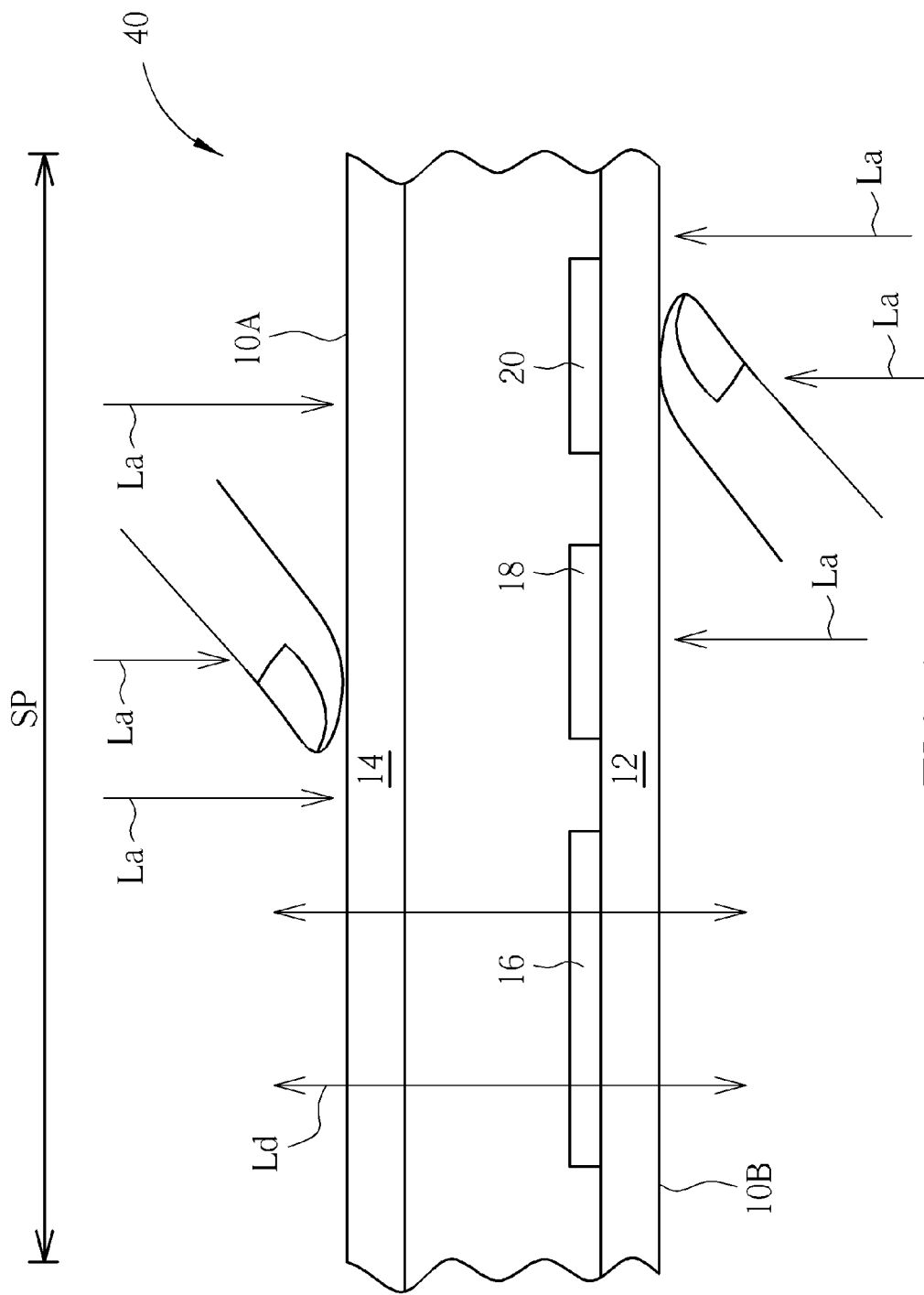
FIG. 9 is a framework diagram illustrating a touch display device according to a third embodiment of the disclosure.

Please refer to FIG. 9. FIG. 9 is a framework diagram illustrating a touch display device according to a third embodiment of the disclosure. As shown in FIG. 9, the touch display device 40 of this embodiment is a photo-interrupter type touch display device, which does not require a stylus able to emit light to perform touch input. When a user uses a touch input device (e.g. finger) 26 to implement touch input on the first display surface 10A, the ambient light La corresponding to the input point will be interrupted by the touch input device 26. Consequently, no light-induced current is generated in the first optical touch sensor device 18 corresponding to the touch point, and thus the position of the touch point can be determined by the processing unit (not shown). Similarly, when a user implements touch input on the second display surface 10B, the ambient light La corresponding to the input point will be interrupted by the touch input device 26. Consequently, no light-induced current is generated in the second optical touch sensor device 20 corresponding to the touch point, and thus the position of the touch point can be determined by the processing unit (not shown).

Figure 10:
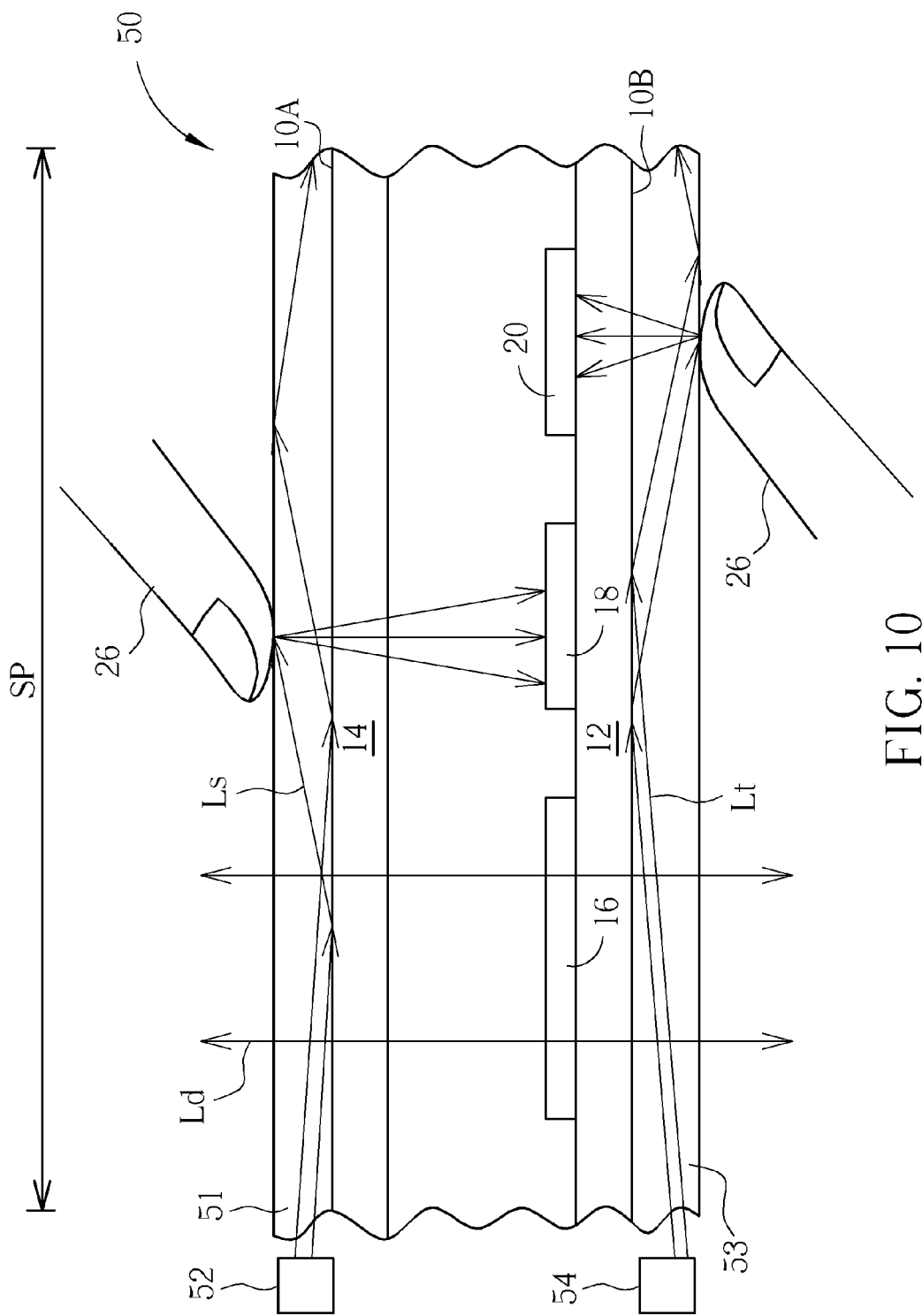
FIG. 10 is a framework diagram illustrating a touch display device according to a fourth embodiment of the disclosure.

Please refer to FIG. 10. FIG. 10 is a framework diagram illustrating a touch display device according to a fourth embodiment of the disclosure. As shown in FIG. 10, the touch display device 50 of this embodiment is a frustrated total internal reflection (FTIR) type touch display device, which does not require a stylus able to emit light to perform touch input. The touch display device 50 further includes a first light guide plate 51, at least one first light generator 52, a second light guide plate 53 and at least one second light generator 54. The first light guide plate 51 is disposed on the first display surface 10A, and the second light guide plate 53 is disposed on the second display surface 10B. The first light generator 52 is disposed on at least one side of the first light guide plate 51 for providing a first light source Ls, and the second light generator 54 is disposed on at least one side of the second light guide plate 53 for providing a second light source Lt. The first light source Ls and the second light source Lt may be visible light source or invisible light source. When a user uses a touch input device 26 to implement touch input on the first display surface 10A, the first light source Ls will be reflected by the touch input device 26 to the first optical touch sensor device 18 corresponding to the touch point, thereby generating touch input signal. When a user uses a touch input device 26 to implement touch input on the second display surface 10B, the second light source Lt will be reflected by the touch input device 26 to the second optical touch sensor device 20 corresponding to the touch point, thereby generating touch input signal.

In conclusion, the touch display device of the disclosure implements dual-sided display function with two transparent substrates. Also, dual-sided touch input function is implemented by the first optical touch sensor devices disposed on the first display surface (front surface) and the second optical touch sensor devices disposed on the second display surface (back surface).

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A touch display panel, comprising:
   a first substrate;
   a second substrate, disposed opposite to the first substrate;
   a plurality of sub-pixel regions;
   a plurality of display devices, disposed in the sub-pixel regions respectively to provide images for a first display surface and a second display surface;
   a plurality of first optical touch sensor devices, disposed on the first substrate and corresponding to at least a portion of the sub-pixel regions, for implementing touch input function on the first display surface;
   a plurality of second optical touch sensor devices, disposed on the first substrate and corresponding to at least a portion of the sub-pixel regions, for implementing touch input function on the second display surface;
   at least one first readout line, disposed on the first substrate and electrically connected to the first optical touch sensor devices; and
   at least one second readout line, disposed on the first substrate and electrically connected to the second optical touch sensor devices.

2. The touch display device of claim 1, further comprising:
   a plurality of gate lines, disposed on the first substrate; and
   a plurality of data lines, disposed on the first substrate, wherein each of the display devices is electrically connected to the corresponding gate line and the corresponding data line.

3. The touch display device of claim 2, wherein the first optical touch sensor device and the second optical touch sensor device are electrically connected to the corresponding gate line.

4. The touch display device of claim 1, wherein
   the first optical touch sensor device comprises:
      a first electrode, disposed on the first substrate;
      a first optical sensor layer, disposed on the first electrode; and
      a second electrode, disposed on the first optical sensor layer; and
   the second optical touch sensor device comprises:
      a third electrode, disposed on the first substrate;
      a second optical sensor layer, disposed on the third electrode; and
      a fourth electrode, disposed on the second optical sensor layer.

5. The touch display device of claim 4, wherein the first electrode comprises an opaque electrode, the second electrode comprises a transparent electrode, the third electrode comprises a transparent electrode, and the fourth electrode comprises an opaque electrode.

6. The touch display device of claim 4, wherein the first electrode and the third electrode are electrically connected to each other, the first optical sensor layer and the second optical sensor layer are electrically connected to each other, and the second electrode and the fourth electrode are electrically connected to each other.

7. The touch display device of claim 6, wherein each of the first electrode, the second electrode, the third electrode and the fourth electrode comprises a transparent electrode.

8. The touch display device of claim 6, wherein the first electrode comprises an opaque electrode, the second electrode comprises a transparent electrode, the third electrode comprises a transparent electrode, and the fourth electrode comprises an opaque electrode.

9. The touch display device of claim 6, wherein each of the first electrode, the second electrode and the third electrode comprises a transparent electrode, and the fourth electrode comprises an opaque electrode.

10. The touch display device of claim 6, wherein the first electrode comprises an opaque electrode, and each of the second electrode, the third electrode and the fourth electrode comprises a transparent electrode.

11. The touch display device of claim 1, further comprising a stylus, wherein the stylus comprises a light-emitting device for emitting a light on the first optical touch sensor device or the second optical touch sensor device for implementing touch input.

12. The touch display device of claim 1, further comprising:
   a first light guide plate, disposed on the first display surface;
   at least one first light generator, disposed on at least one side of the first light guide plate, for providing a first light source;
   a second light guide plate, disposed on the second display surface; and
   at least one second light generator, disposed on at least one side of the second light guide plate, for providing a second light source.

13. The touch display device of claim 1, wherein the second display surface is opposite to the first display surface, and the first display surface and the second display surface are two surfaces of the touch display device disposed oppositely and in parallel, respectively.

14. A touch display panel, comprising:
   a first substrate;
   a second substrate, disposed opposite to the first substrate;
   a plurality of sub-pixel regions;
   a plurality of display devices, disposed in the sub-pixel regions respectively to provide images for a first display surface and a second display surface;
   a plurality of first optical touch sensor devices, disposed on the first substrate and corresponding to at least a portion of the sub-pixel regions, for implementing touch input function on the first display surface;
   a plurality of second optical touch sensor devices, disposed on the first substrate and corresponding to at least a portion of the sub-pixel regions, for implementing touch input function on the second display surface; and
   at least one readout line, disposed on the first substrate and electrically connected to the first optical touch sensor devices and the second optical touch sensor devices.

15. The touch display device of claim 14, further comprising:
   a plurality of gate lines, disposed on the first substrate; and
   a plurality of data lines, disposed on the first substrate, wherein each of the display devices is electrically connected to the corresponding gate line and the corresponding data line.

16. The touch display device of claim 15, wherein the first optical touch sensor device and the second optical touch sensor device are electrically connected to the corresponding gate line.

17. The touch display device of claim 14, wherein
   the first optical touch sensor device comprises:
      a first electrode, disposed on the first substrate;
      a first optical sensor layer, disposed on the first electrode; and
      a second electrode, disposed on the first optical sensor layer; and
   the second optical touch sensor device comprises:
      a third electrode, disposed on the first substrate;

a second optical sensor layer, disposed on the third electrode; and a fourth electrode, disposed on the second optical sensor layer.

18. The touch display device of claim 17, wherein the first electrode comprises an opaque electrode, the second electrode comprises a transparent electrode, the third electrode comprises a transparent electrode, and the fourth electrode comprises an opaque electrode.

19. The touch display device of claim 17, wherein the first electrode and the third electrode are electrically connected to each other, the first optical sensor layer and the second optical sensor layer are electrically connected to each other, and the second electrode and the fourth electrode are electrically connected to each other.

20. The touch display device of claim 19, wherein each of the first electrode, the second electrode, the third electrode and the fourth electrode comprises a transparent electrode.

21. The touch display device of claim 19, wherein the first electrode comprises an opaque electrode, the second electrode comprises a transparent electrode, the third electrode comprises a transparent electrode, and the fourth electrode comprises an opaque electrode.

22. The touch display device of claim 19, wherein each of the first electrode, the second electrode and the third electrode comprises a transparent electrode, and the fourth electrode comprises an opaque electrode.

23. The touch display device of claim 19, wherein the first electrode comprises an opaque electrode, and each of the second electrode, the third electrode and the fourth electrode comprises a transparent electrode.

24. The touch display device of claim 14, further comprising a stylus, wherein the stylus comprises a light-emitting device for emitting a light on the first optical touch sensor device or the second optical touch sensor device for implementing touch input.

25. The touch display device of claim 14, further comprising:

a first light guide plate, disposed on the first display surface;

at least one first light generator, disposed on at least one side of the first light guide plate, for providing a first light source;

a second light guide plate, disposed on the second display surface; and at least one second light generator, disposed on at least one side of the second light guide plate, for providing a second light source.

26. The touch display device of claim 14, wherein the second display surface is opposite to the first display surface, and the first display surface and the second display surface are two surfaces of the touch display device disposed oppositely and in parallel, respectively.

* * * * *